US012770404B2

(12) United States Patent
Wilf

(10) Patent No.: US 12,770,404 B2
(45) Date of Patent: Oct. 20, 2026

(54) TRACKABLE OBJECTS FOR DISTANCE ESTIMATION

(71) Applicant: AUTOBRAINS TECHNOLOGIES LTD., Tel Aviv (IL)

(72) Inventor: Itzhak Wilf, Savyon (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 305 days.

(21) Appl. No.: 18/496,658

(22) Filed: Oct. 27, 2023

(65) Prior Publication Data

US 2025/0131735 A1 Apr. 24, 2025

Related U.S. Application Data

(63) Continuation of application No. 18/493,274, filed on Oct. 24, 2023.

(51) Int. Cl.
*G06V 20/58* (2022.01)
*G06T 7/20* (2017.01)
*G06V 10/46* (2022.01)

(52) U.S. Cl.
CPC ................ *G06V 20/58* (2022.01); *G06T 7/20* (2013.01); *G06V 10/46* (2022.01)

(58) Field of Classification Search
CPC ........ G06V 20/58; G06V 10/46; G06V 10/25; G06V 10/75; G06V 20/56; G06T 7/20; G06T 2207/10016; G06T 2207/30252; G06T 2207/30261; G06T 7/246; G06T 7/248; G06T 7/80; G01S 11/12
USPC .......................................................... 382/103
See application file for complete search history.

(56) References Cited

U.S. PATENT DOCUMENTS

| | | | | |
|---|---|---|---|---|
| 11,080,562 B1 * | 8/2021 | Saxena | ................ | G06V 10/451 |
| 2018/0304807 A1 * | 10/2018 | Boesch | ................ | G06V 20/584 |
| 2020/0193643 A1 * | 6/2020 | Hess | ...................... | G06V 10/44 |
| 2022/0057213 A1 * | 2/2022 | Singhal | ..................... | G06T 7/74 |

* cited by examiner

*Primary Examiner* — Jennifer Mehmood
*Assistant Examiner* — Dustin Bilodeau
(74) *Attorney, Agent, or Firm* — RECHES PATENTS

(57) ABSTRACT

A method for distance estimation of an object from a vehicle is disclosed. The method includes: obtaining an image frame including the object; identifying a first set of key points of the object from the image frame; obtaining a second set of key points that correlates to the first set of key points from a non-volatile memory; obtaining spatial information about the second set of key points from the non-volatile memory; and evaluating a distance of the object from the vehicle based on the first set of key points and the spatial information about the second set of key points.

11 Claims, 7 Drawing Sheets

Image frame
102

Image frame
112

TRACKABLE OBJECTS FOR DISTANCE ESTIMATION

FIELD OF DISCLOSURE

The present disclosure relates to the field of computer technology, and more particularly, to a method and apparatus for various object tracking purposes, such as bounding box generation, distance estimation, auto-calibration, for an autonomous driving system.

BACKGROUND

As computing and vehicular technologies continue to evolve, autonomy-related features have become more powerful and widely available, and capable of controlling vehicles in a wider variety of circumstances. For automobiles, for example, the Society of Automotive Engineers (SAE) has established a standard (J3016) that identifies six levels of driving automation from "no automation" to "full automation". The SAE standard defines Level 0 as "no automation" with full-time performance by the human driver of all aspects of the dynamic driving task, even when enhanced by warning or intervention systems. Level 1 is defined as "driver assistance", where a vehicle controls steering or acceleration/deceleration (but not both) in at least some driving modes, leaving the operator to perform all remaining aspects of the dynamic driving task. Level 2 is defined as "partial automation", where the vehicle controls steering and acceleration/deceleration in at least some driving modes, leaving the operator to perform all remaining aspects of the dynamic driving task. Level 3 is defined as "conditional automation", where, for at least some driving modes, the automated driving system performs all aspects of the dynamic driving task, with the expectation that the human driver will respond appropriately to a request to intervene. Level 4 is defined as "high automation", where, for only certain conditions, the automated driving system performs all aspects of the dynamic driving task even if a human driver does not respond appropriately to a request to intervene. The certain conditions for Level 4 can be, for example, certain types of roads (e.g., highways) and/or certain geographic areas (e.g., a geofenced metropolitan area which has been adequately mapped). Finally, Level 5 is defined as "full automation", where a vehicle is capable of operating without operator input under all conditions.

Tracking of stationary and moving objects are critical functionalities of autonomous driving technology. A fundamental challenge of any autonomy-related technology relates to collecting and interpreting information about a vehicle's surrounding environment. For example, distance measurement is extensively used in the advanced driver assistance system to provide the security alerts for the driver. and is thus significantly important for autonomous driving. The calibration of sensor parameters (e.g., cameras, etc.) is also a critical part regardless of whether it is in applications, such as optical motion capture, image measurement, or machine vision applications. The accuracy of the calibration results and the stability of the algorithm directly affect the accuracy of the results produced through the operation of the camera sensor. Moreover, the calibration accuracy of the camera may directly affect the capturing accuracy of the entire optical motion capturing system, and thus may have a limited error tolerance. For example, a small calibration error may result in a substantial deviation. Therefore, performing a desired camera-calibration process is a prerequisite for subsequent operation.

Continuing efforts are being made to improve the detecting and the tracking of surrounding objects. With the improvements, autonomous vehicles increasingly are able to reliably operate in increasingly complex environments, and accommodate both expected and unexpected interactions within an environment. For example, to operate safely, autonomous vehicles should account for objects-such as vehicles, people, trees, animals, buildings, signs, and poles-when planning paths through the environment. Typically, a sequence of image frames obtained from one or more sensors is processed to detect and track objects by the autonomous driving system. In general, manual identification and tracking of moving targets is slow, intensive and in many cases impractical. Automated solutions have been proposed in recent years towards tackling problems associated with autonomous driving. However, techniques related to automatic processing of continuous image frames have limitations with respect to recognizing targets in fields of views of the image frame. Additionally, algorithms that are being used for bounding box generation, distance estimation, auto-calibration in one or more image frames may not provide satisfactory subjective quality. Furthermore, many of these algorithms are incapable of processing the data optimally because of inherent uncertainties of the real-world data.

As the autonomous driving system needs to continuously monitor its surroundings, video/image detection and tracking, including bounding box generation, distance estimation, and auto-calibration, is an integral part of an autonomous driving system. Thus, it is important to develop algorithms that reduce computational complexity yet maintain the stability and accuracy of the automated driving operations. Also, advanced algorithms capable of optimally processing the real time images to reliably detect stationary and moving targets are needed.

SUMMARY

The present disclosure proposes a method and an apparatus for object detection and tracking, including bounding box generation, distance estimation, auto-calibration, for an autonomous driving system. In some embodiments, a method for tracking an object in one or more image frames is disclosed. The method may include: obtaining a first image frame containing the object; determining a first set of key points of the object in the first image frame and a first set of descriptors associated with the first set of key points; determining a second set of key points from the first set of key points and a second set of descriptors from the first set of the descriptors; and generating a bounding box of the object based on the second set of key points and descriptors. The so-called bounding box represents a region in which the target object is located in the target scenario displayed in the current image frame, and the region includes a location and a range. More specifically, the bounding box may be represented as an imaginary detection box of any shape such as a rectangular box, an elliptic box, or a hexagonal box enclosing the detecting/tracking objects. These bounding boxes are used for marking the location and a range of the target object in the target scenario. Using a rectangular bounding box as an example, a location annotated by the rectangular box may be understood as coordinates at the corners or the center of the region, and a range annotated by the rectangular box may be understood as a length and a width of the region. The region enclosed by the rectangular box is the region in which the target object is in the target scenario. Thus, bounding boxes are the key elements and one of the primary image processing tools for autonomous driving, because they are integral in self-driving or autonomous vehicles to identify objects on the road like buildings, traffic signals, any obstructions, and more. Bounding boxes help annotate obstacles and enable the autonomous driving system to operate safely, for example, prevent accidents in case of congestion. While examples are described herein using bounding boxes as examples of bounding regions, a person having ordinary skill in the art will appreciate that any other suitable bounding regions could be used instead of bounding boxes, such as bounding circles, bounding ellipses, or any other suitably shaped regions representing tracking objects.

In some embodiments, the method may further include obtaining a second image frame, and the second image frame contains the object. In such embodiments, the second set of key points have a motion pattern identified by comparing key points in the first image frame and the second image frame, and the motion pattern is different from a motion pattern of another set of key points separate from the second set of key points. In different embodiments, the step of determining the second set of key points from the first set of key points and the second set of descriptors from the first set of descriptors is done by comparing a distance between corresponding first set of key points in the first and second image frames with a threshold, based on a ratio test, based on a cross check, or based on a grid-based motion statistics method. In some embodiments, the method may further include obtaining a second image frame containing the object; obtaining a first reference bounding box of the object from the first image frame; obtaining a second reference bounding box of the object from the second image frame; and generating the bounding box of the object based on the first reference bounding box and the second reference bounding box. In such embodiments, generating the bounding box of the object based on the first reference bounding box and the second reference bounding box includes averaging a plurality of reference bounding boxes.

In some embodiments, another method for estimating the distance of an object from a vehicle during driving is disclosed. The method may include: obtaining an image frame containing the object; identifying a first set of key points of the object from the image frame; obtaining a second set of key points that correlates to the first set of key points from a non-volatile memory; obtaining spatial information about the second set of key points from the non-volatile memory; and evaluating a distance of the object from the vehicle based on the first set of key points and the spatial information about the second set of key points.

In some embodiments, the image frame is captured by a device that is associated with a vehicle, a stationary object, or a drone. In some embodiments, evaluating the distance of the object from the vehicle includes matching geometric parameters of one or more of the second set of key points with geometric parameters of one or more of the first set of key points. In some embodiments, the non-volatile memory includes descriptors associated with the first and/or second set of key points. In such embodiments, the distance of the object from the vehicle is evaluated based on the descriptors. In some embodiments, the object is a second vehicle, and the method further comprises obtaining a make, a model, or a model year of the second vehicle from the non-volatile memory. In some embodiments, the non-volatile memory is a cloud database.

In some further embodiments, another method for auto-calibrating a camera sensor during driving is disclosed. The method may include: obtaining a first image frame by the camera including an object in motion; obtaining a second image frame by the camera including the object; determining a first set of key points of the object in the first image frame; determining a second set of key points of the object in the second image frame; obtaining a first spatial information about the first set of key points from a non-volatile memory; obtaining a second spatial information about the second set of key points from the same or a different non-volatile memory; and auto-calibrating the camera based on the first and the second spatial information.

In some embodiments, the first image frame and the second image frame are within a sequence of different image frames. In some embodiments, the first image frame is earlier in time than the second image frame in a sequence. In some embodiments, the camera is associated with a vehicle, a stationary object, or a drone. In some embodiments, the non-volatile memory includes descriptors associated with the first or second set of key points. In such embodiments, the spatial information is obtained from the non-volatile memory based on the descriptors. In some embodiments, the non-volatile memory is a cloud database.

In some embodiments, the disclosed method may be operated by an apparatus of an autonomous driving system. The apparatus may include at least one processor and a memory storing instructions. The instructions when executed by the at least one processor cause the at least one processor to perform operations of the disclosed method for object tracking for an autonomous driving system. For example, in some embodiments, the disclosed method may be programmed as computer executable instructions stored in non-transitory computer readable medium. The non-transitory computer readable medium, when loaded to a computer, directs a processor of the computer to execute the disclosed method. The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

It should be understood that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF DRAWINGS

To illustrate the embodiments of the present disclosure or related art more clearly, the following figures will be described in the embodiments are briefly introduced. It is obvious that the drawings are merely some embodiments of the present disclosure, a person having ordinary skill in this field may obtain other figures according to these figures without paying the premise. The arrows in the figures indicate a relationship whereby the component the arrow is pointing to is trained/applied using the component the arrow is pointing from. The embodiments of the disclosure will be understood and appreciated more fully from the following detailed description, taken in conjunction with the drawings in which.

Figure 1A:
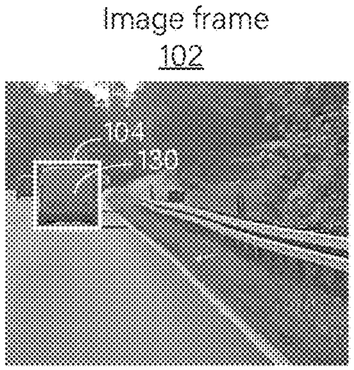
FIG. 1A is an image frame illustrating an example of a bounding box, in accordance with some embodiments of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure. In the following detailed description, numerous specific details are set forth to provide a thorough understanding of the invention. However, it will be understood by those skilled in the art that the present invention may be practiced without these specific details. In other instances, well-known methods, procedures, and components have not been described in detail so as not to obscure the present invention. The subject matter regarding the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention. For example, the specification and/or drawings may refer to a processor or to a processing circuitry. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

The following specification and/or drawings may refer to an image or an image frame. An image is an example of a media unit. Any reference to an image may be applied mutatis mutandis to a media unit. A media unit may be an example of a sensed information unit (SIU). Any reference to a media unit may be applied mutatis mutandis to any type of natural signal such as but not limited to signal generated by nature, signal representing human behavior, signal representing operations related to the vehicle signals, geodetic signals, geophysical signals, textual signals, numerical signals, time series signals, and the like. Any reference to a media unit may be applied mutatis mutandis to the SIU. The SIU may be of any kind and may be sensed by any type of sensors-such as a visual light camera, an audio sensor, a sensor that may sense infrared, radar imagery, ultrasound, electro-optics, radiography, Light Detection and Ranging (LIDAR), a thermal sensor, a passive sensor, an active sensor, etc. The sensing may include generating samples (e.g., pixel, audio signals, etc.) that represent the signal that is transmitted, or otherwise reach the sensor. The SIU may have one or more images, one or more video clips, textual information regarding the one or more images, text describing kinematic information, and the like.

Any combination of any module or unit listed in any of the figures, any part of the specification and/or any claims may be provided. Any one of the units and/or modules that are illustrated in the application, may be implemented in hardware and/or code, instructions and/or commands stored in a non-transitory computer readable medium, may be included in a vehicle, outside a vehicle, in a mobile device, in a server, and the like. The vehicle may be any type of vehicle—for example a ground transportation vehicle, an airborne vehicle, or a water vessel. The vehicle is also referred to as an ego-vehicle. It should be understood that the autonomous driving includes at least partially autonomous (semi-autonomous) driving of a vehicle, which includes all the L2 level types or higher defined in the SAE standard.

The present disclosure proposes a method and an apparatus for object detection and tracking, including bounding box generation, distance estimation, auto-calibration, for an autonomous driving system. To do so, various methods and systems are disclosed for processing images for an autonomous driving vehicle. Specifically, a plurality of key points (i.e., characteristic points, feature points, or interest points) and associated descriptors may be provided for various autonomous driving purposes, for example, in a continuous process, (i.e., across a timeframe/timeline, generating bounding boxes that are adaptable to their correct sizing/ locations, estimating distances, auto-calibrating, etc.). Key points are a simplified way to represent the complex objects (e.g., people, trees, animals, buildings, signs, and poles, vehicles, etc.) by using a limited number of points, which typically correspond to distinguishing/important features of the objects. In other words, key points are a compact and structured way to convey object information otherwise encoded in the pixels and sensor scans. Preferably, the key points may be selected and the patch(es) around them processed such that they are invariant to image scale changes and/or rotation and provide robust matching across a substantial range of distortions, changes in point of view, and/or noise and change in illumination. After the key points in an image are detected and located, they may be identified or described by using various descriptors. A descriptor is a vector that is used to describe the characteristics of the neighborhood of a key point in order to identify it from other key points in a given image and find a corresponding key point in a different image of the same scene, or same object, taken at a different point in time or from a different condition, such as a different time, a different sensor angle, or under different lighting conditions. For example, descriptors may represent the visual features of the content in images, such as shape, color, texture, and/or rotation, among other image characteristics. In order to be well suited for tasks such as object detection and tracking, the descriptors may preferably be distinctive in the sense that a single feature can be correctly matched with high probability against a large database of features from a plurality of target images. In different embodiments, the descriptors may be image based or sematic based. The disclosure proposes various embodiments of obtaining key point descriptors by different matching algorithms to reduce computational cost, which allow the computational efficiency of the autonomous driving system to be increased in both detecting and/or tracking objects in real-time and/or training models.

Figure 1B:
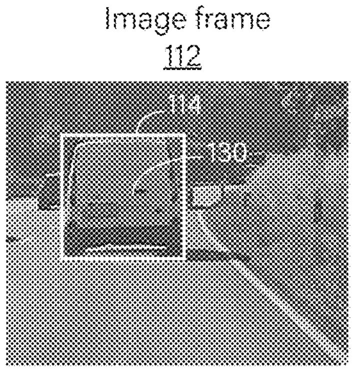
FIG. 1B is an image frame illustrating an example of a bounding box, in accordance with some embodiments of the present disclosure.
Figure 1C:
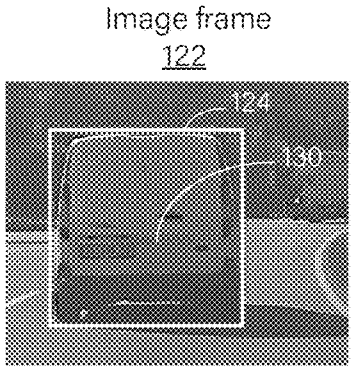
FIG. 1C is an image frame illustrating an example of a bounding box, in accordance with some embodiments of the present disclosure.

Now referring to the drawings, wherein like numbers denote like parts throughout the several views, FIGS. 1A-1C are image frames illustrating an example of generating bounding boxes. FIGS. 1A-1C illustrate an image of a road and identification of an object (e.g., a vehicle), in accordance with some embodiments. The vehicle may be controlled by the autonomous driving system described below. The image may be captured from a camera sensor coupled to the vehicle while travelling on the road. For example, the image depicts the road lanes, white lines representing road lane boundaries, and moving vehicles. FIG. 1A illustrates a first image frame 102 including a first bounding box 104; FIG. 1B illustrates a second image frame 112 including a second bounding box 114; and FIG. 1C illustrates a third image frame 122 including a third bounding box 124. The images/image frames 102, 112, and 122 are a set of continuous image frames, which may be video frames from a video. For example, image frames 112 and 122 may be continuous image frames starting from the first image frame 102. The bounding boxes 104, 114, and 124 are associated with an object 130, which is a vehicle in this example. The bounding boxes 104, 114, and 124 may be generated by object detectors (not shown) that identify the object 130 in the image frames 102, 112, and 122. In an embodiment, to determine that the same object 130 is being identified in each of the frames 102, 112, and 122, insight may be gained from a tracking module (not shown) that assigns an object ID to the object 130 in specific single frame 102, 112, or 122. Alternatively, as will be explained in more detail below, a keypoint matching process may be performed to establish that the same object 130 is being imaged, identified and tracked in each of the frames 102, 112, and 122. As can be seen in FIGS. 1A-1C, the bounding boxes 104, 114, and 124 change sizes and locations from one frame to another, with the tracked object 130 being in movement.

Figure 2A:
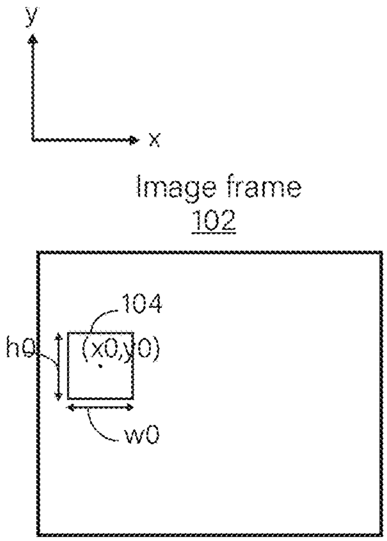
FIG. 2A is a simplified diagram of an image frame with a bounding box corresponding to that of FIG. 1A, in accordance with some embodiments of the present disclosure.
Figure 2B:
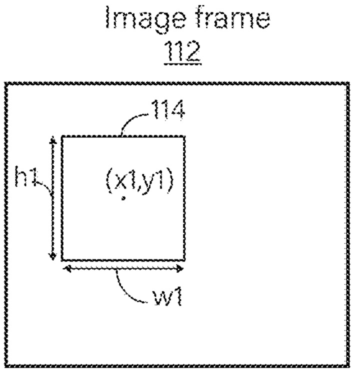
FIG. 2B is a simplified diagram of an image frame with a bounding box corresponding to that of FIG. 1B, in accordance with some embodiments of the present disclosure.
Figure 2C:
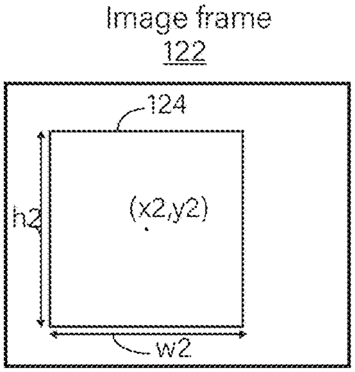
FIG. 2C is a simplified diagram of the image frame with a bounding box corresponding to that of FIG. 1C, in accordance with some embodiments of the present disclosure.

FIGS. 2A-2C provide a simplified illustration of FIGS. 1A-1C, which includes bounding boxes 104, 114, and 124 in, respectively, image frames 102, 112, and 122. Referring to FIG. 2A, the first bounding box 104 has a height of h0 and a width of w0. The center location of the first bounding box 104 is at the pixel coordinates of (x0, y0) within the first image frame 102, with x0 representing the pixel coordinate of the center location of the first bounding box 104 along a horizontal direction, and y0 representing the pixel coordinate of the center location of the first bounding box 104 along a vertical direction. Similarly, the second bounding box 114 has a height of h1 and a width of w1, and the center location of the second bounding box 114 is at the pixel coordinates of (x1, y1) within the second image frame 112. Further, the third bounding box 124 has a height of h2 and a width of w2, and the center location of the third bounding box 124 is at the pixel coordinates of (x2, y2) within the third image frame 122.

As shown in FIGS. 2A-2C, the bounding boxes experience a change in the height and width across the image frames 102, 112, and 122, even though the bounding boxes are associated with the same object 130. The change in the bounding box dimensions can lead to errors in the tracking of object 130. For example, the dimension differences between heights and widths may incorrectly indicate that the object 130 has decreased or expanded in size, when in fact object 130 does not experience any shrinking or expansion. The change in the dimensions also creates the visual appearance of shrinking and/or expansion of the bounding box when displayed, which can impede the visual tracking of object 130. Moreover, as shown in FIGS. 2A-2C, the bounding box in each of the frames 102, 112, and 122 also experiences a change in the center locations, which can introduce further errors in the tracking of object 130. For example, between image frames 102 and 112, the system may determine, based on the center locations, that the bounding box moves over a horizontal distance between x0 and x1, and over a vertical distance between y0 and y1. Also, between image frames 112 and 122, the system may determine that the output bounding box moves over a horizontal distance between x1 and x2, and over a vertical distance between y1 and y2. As shown in FIGS. 2A-2C, the change in the dimensions of the bounding box also contributes to the change in the respective center location. Therefore, distances between the center locations of the bounding boxes (along the horizontal and/or vertical directions) may not correspond to the actual movement of object 130. In some embodiments, a system that relies on the changes in the center locations of the bounding boxes to track the motion of object 130 may, for example, overestimate the speed of motion, determine the wrong direction for the motion, and/or otherwise introduce errors in the tracking of object 130. Thus, it is critical to generate bounding boxes that are adaptable to their correct sizing/locations in a continuous process for object tracking.

As discussed above, the smoothness of an output bounding box can refer to a rate of change in one or more attributes of the output bounding box over a set of continuous frames. Here, the smoothness of the bounding box between image frames 102 or 112, between image frames 102 and 122, or between image frames 112 and 122, can be determined based on a change in, for example, the width, the height, and/or the center location of the output bounding box. For example, the smoothness of the bounding box across image frames 102 and 112 (e.g., represented by the bounding boxes 104 and 114) can be determined based on, for example, a width difference between widths w0 and w1, a height difference between heights h0 and h1, a horizontal distance between pixel coordinates x0 and x1, a vertical distance between pixel coordinates y0 and y1, or any combination thereof. Moreover, the smoothness of an output bounding box across image frames 112 and 122 (e.g., represented by output bounding boxes 114 and 124) can be determined based on, for example, a width difference between widths w0 and w1, a height difference between heights h0 and h1, a horizontal distance between pixel coordinates x0 and x1, a vertical distance between pixel coordinates y0 and y1, or any combination thereof. To improve the smoothness of the output bounding box, in some embodiments, certain image processing of the bounding box can be performed before outputting the bounding boxes that are used for object tracking. The image processing may include, for example, generating a bounding box based on matching descriptors of different sets of key points, or a history of the bounding box in previous frames. More specifically, generating the third bounding box 124 may be based on a set of descriptors obtained by matching the descriptors in the previous image frames 102 and 112, or by averaging the first bounding box 104 and the second bounding box 114, after compensating for the relative image motion between the image boxes.

Figure 3:
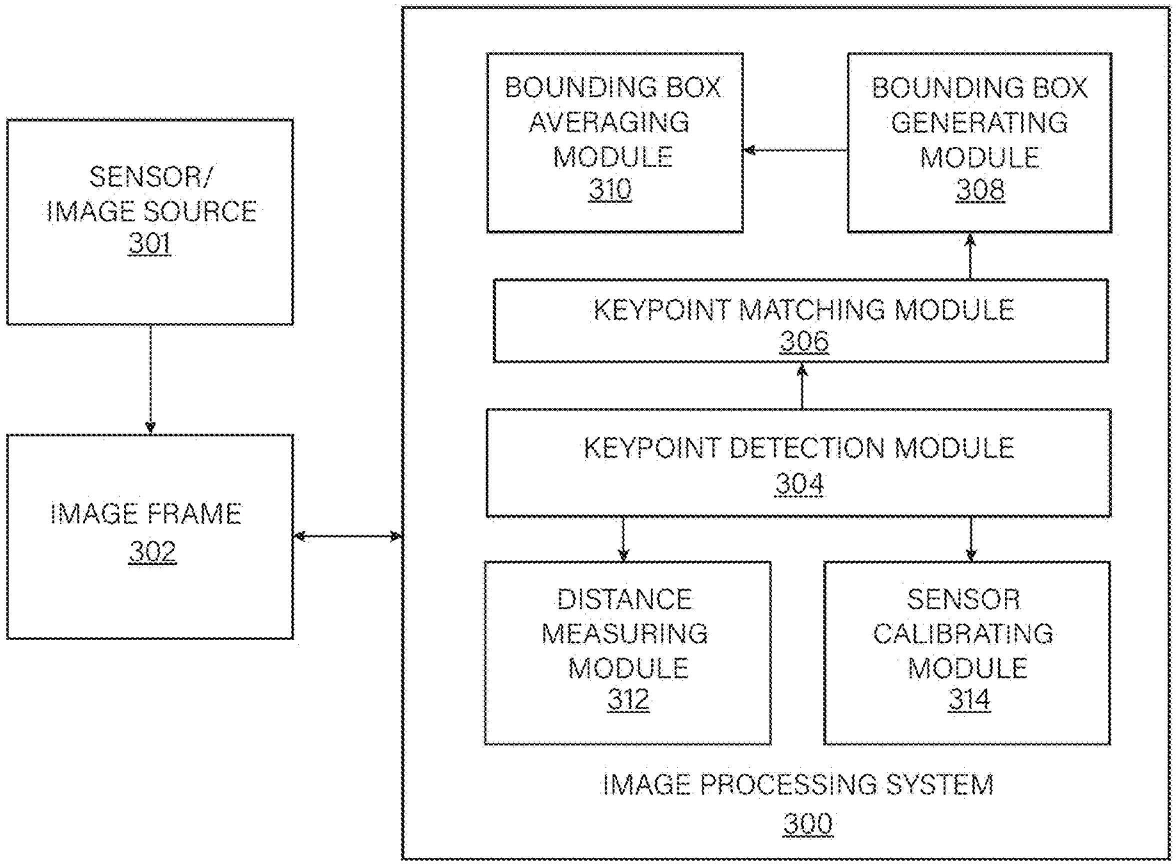
FIG. 3 is a block diagram illustrating an example of the proposed image processing system, in accordance with some embodiments of the present disclosure.
Figure 9:
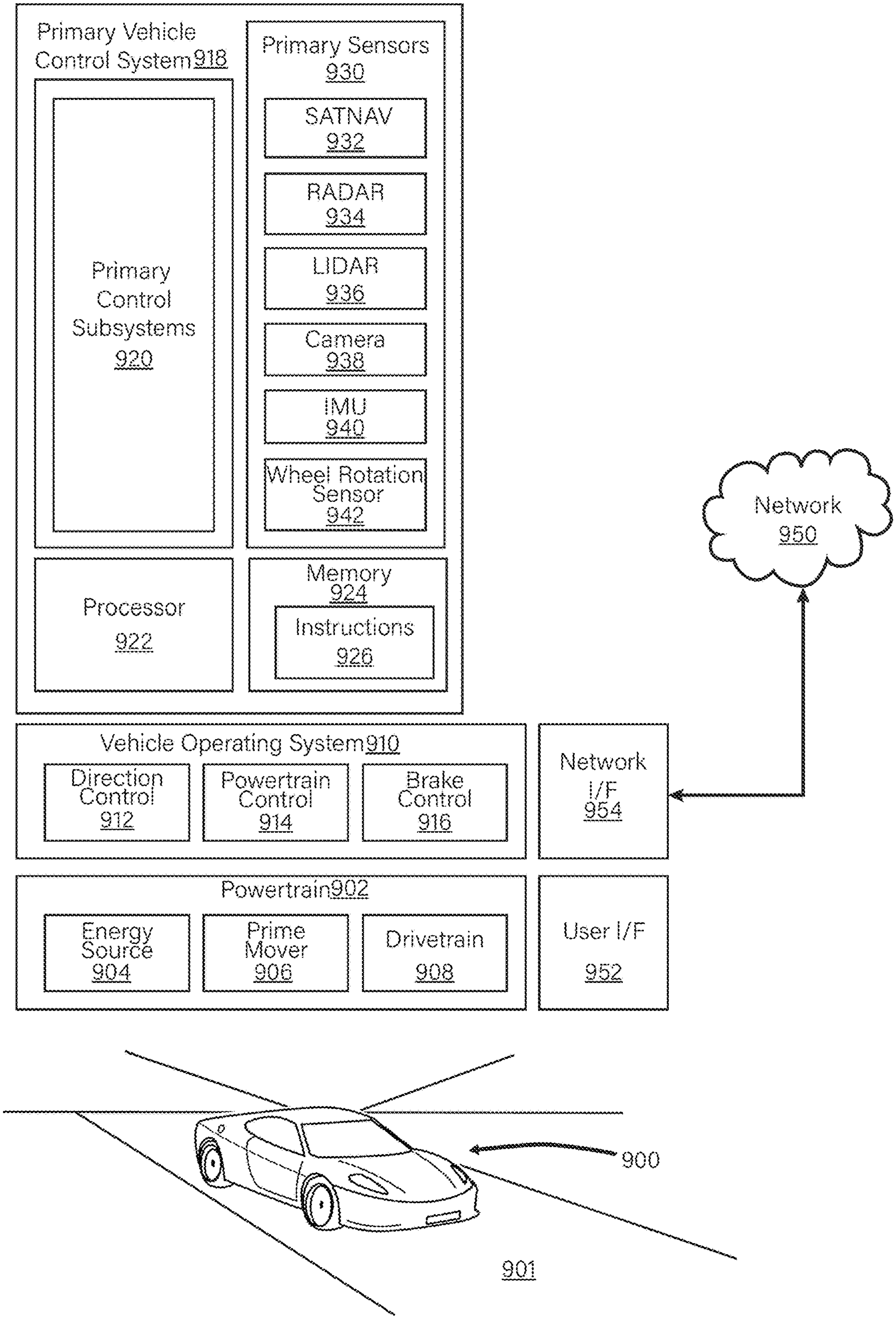
FIG. 9 illustrates an example hardware and software environment for an autonomous vehicle, in accordance with some embodiments of the present disclosure.

FIG. 3 is a block diagram illustrating an image processing system 300 that executes proposed methods for various object tracking purposes, such as bounding box generation, distance estimation, auto-calibration, including but not limited to, autonomous driving systems, in accordance with some embodiments of the present disclosure. The image processing system 300 may include a computer system for using, training, or operating one or more systems. It should be understood that these and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components, or in conjunction with other components, and in any suitable combination and location. Various functions described herein as being performed by one or more entities may be carried out by hardware, firmware, and/or software. For instance, some functions may be carried out by a processor executing instructions stored in memory. The image processing system 300 may be a component of a vehicle, a robotic device, or another device. For example, as shown in FIG. 9, the image processing may be a component of a vehicle 900. Aspects of the present disclosure are not limited to the image processing system 300 being a component of the vehicle 900, as other types of agents, such as a bus, boat, drone, or robot, are also contemplated for using the image processing system 300. In some embodiments, the image processing system 300 may be a descriptor-free image processing system.

In some embodiments, FIG. 3 depicts an example of the image processing system 300 that can be used to perform object detection and tracking in images with high accuracy and in real-time. As used herein, the term "real-time" refers to detecting and tracking objects in an image sequence as a plurality of image frames is being captured. The image processing system 300 may include a key point detection module 304, a key point matching module 306, a bounding box generating module 308, a bounding box averaging module 310, a distance measuring module 312, and a sensor calibrating module 314. The key point detection module 304 may receive one or more image frames 302 in grayscale or color of an image sequence provided by one or more sensors/image sources 301. For example, the proposed image processing method/system may accept image or video data from various types of sensors 301, e.g., cameras, LIDAR sensors, etc. In different embodiments, the sensor/image source 301 can include a sensor or multiple sensors. In some embodiments, the image processing system 300 and the sensor/image source 301 can be part of the same system. In some other embodiments, the image processing system 300 and the sensor/image source 301 can be part of separate computing systems including one or more wireless transceivers for wireless communications to the image processing system 300. The image processing system 300 may include a processing unit with one or more of any suitable processors, controllers or digital signal processors that can provide sufficient processing power depending on the configuration, and operational requirements of the system 300. For example, in some embodiments, the processing unit can include one or more high-performance processors or one or more GPUs working with a CPU as described previously. In embodiments where there is more than one processor, each processor may be configured to perform different dedicated tasks. In alternative embodiments, specialized hardware can be used to provide some of the functions performed by the processing unit.

In some embodiments, the image frame 302 may also be referred to herein as an image, a video frame, or a picture. The image frame 302 can be part of one or more images or image sequences. In different embodiments, the image frame 302 may be collected directly from the sensors, or may be sensory data recorded, (e.g., recorded driving images), from any devices or shared by another device in real time. For example, the image frame 302 may be raw data from one or more sensors of the same or a separate vehicle. In some embodiments, the image frame 302 may be an image captured by a camera sensor that includes Red-Green-Blue (RGB) value of pixels. The image frame 302 may be a raw SIU, a processed SIU, text information, information derived from the SIU, and the like. In different embodiments, the loading of the image frame 302 may be from a local disk, over a suitable network location, from a remote storage location, etc. Obtaining image frame 302 may include generating the image, receiving the image, participating in a processing of the image, processing only a part of the image and/or receiving only another part of the image. The processing of the image frame 302 may include at least one out of detection, noise reduction, improvement of signal to noise ratio, defining bounding boxes, and the like. The image frame 302 may be received from one or more sources such as one or more sensors, one or more communication units, one or more memory units, one or more image processors, and the like. For example, in some embodiments, the captured input image frame 302 may be in true color, which may be converted into binary images and noise will be removed by applying the morphological operations and filter techniques. Except for the region of interest, the rest of the elements from the image may be removed by using erosion and dilation techniques.

In some embodiments, the key point detection module 304 may be configured to perform object detection to detect or determine a set of key points for the object and generate descriptors associated with the set of key points. For example, the key point detection module 304 may be configured to identify highly distinctive key points or key points of geometrical interest for the image frame 302, which can subsequently be used by the key point matching module 306 to obtain a plurality of descriptors. There are various methods and systems for performing key point detection. For example, "classical" methods such as Scale-Invariant Feature Transform (SIFT) or (Speeded Up Robust Features (SURF), including deep methods such as ASLFeat or D2Net may be used for detecting keypoints and extracting descriptors. With the unique (i.e., good potential) key points or the locations of the most distinctive features in the image frame identified, content around the key points may be normalized to compute a descriptor for the associated key point. The descriptor may be a vector of numbers that describes the visual appearance of the key point. Each of the descriptors may represent, mark, identify, or otherwise describe individual pixels, or multiple pixels, within the corresponding image frames.

Figure 4:
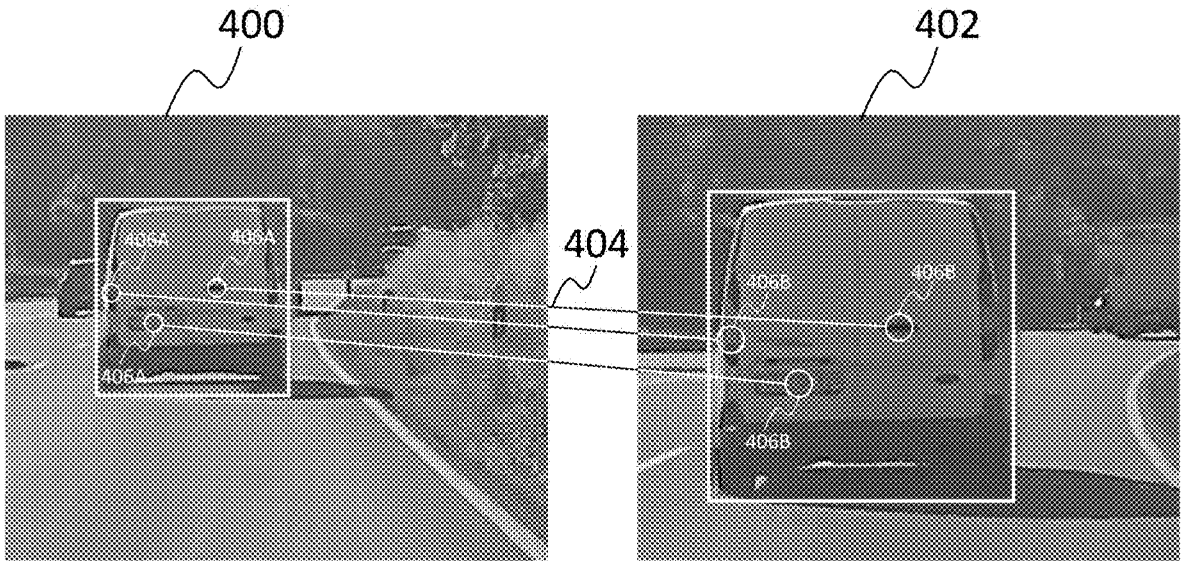
FIG. 4 is a diagram illustrating an example of matching corresponding sets of key points for various purposes, such as generating bounding boxes, evaluating distances, auto-calibrating of a camera, etc., in accordance with some embodiments of the present disclosure.

Next, the key point matching module 306 may be configured to compare and match identified key points and associated descriptors across different image frames. FIG. 4 is a diagram illustrating an example of determining a second set of key points from a first set of key points, and a second set of descriptors from a first set of descriptors by key point matching. Here, the second set of key points and corresponding key point descriptors 406B in a target image frame 402 for generating corresponding bounding boxes may be determined through matching the first set of key points and corresponding key point descriptors 406A in a reference image frame 400. In such embodiments, each key point 406A and 406B may correspond to a feature of the reference image frame 400 and target image frame 402, respectively. Thus, in some embodiments, a key point may be referred to as a feature, such as vehicle logos and taillights. Key point correspondences between the reference image frame 400 and the target image frame 402 are depicted using connector lines 404 between corresponding key points and descriptors 406A and 406B (e.g., the vehicle license plate, the vehicle light, the handle on the vehicle cargo door, etc.). The connector line 404 may connect a center of receptive fields for matching fields of the key points of 406A and 406B. The connector line 404 is provided for illustrative purposes, and the number of connector lines 404 may correspond to the number of matching key points and descriptors. In some embodiments, for example, during real-world deployment, the connector line 404 may not be visually generated between matched images 400 and 402. It should be understood that the number of matching key points may vary in different embodiments, and there may be more, or less matching key points than as shown here. In some embodiments of the present disclosure, a constellation of key points 406A of the reference image frame 400 may be matched with a constellation of key points 406B of the target image frame 402. That is, rather than finding one or more individually matching key points 406A and 406B, some aspects of the present disclosure match groups of key points 406A and 406B. Such group matching may remove ambiguities, such as occlusion or dynamic changes, which exist between individual corresponding key points 406A and 406B of different image frames 400 and 402.

In some embodiments, comparing key points and/or other characteristics of key points or patches surrounding the key points may be conducted with a database of previously-stored key points and/or descriptors. It should be understood that neural networks may be trained to match key points and/or descriptors. In some embodiments, neural networks may detect features and match detected features independent from certain geometric transformations, such as image translation, scale, and rotation. In such embodiments, the systems extract a plurality of key points and may generate a descriptor for each key point. In such embodiments, the descriptor may be a string describing the key point, which is independent from geometric transformation.

After matching the key points and associated descriptors, there may be multiple potential matches for each key point and associated descriptor. To filter out incorrect matches, a matching criterion, such as a ratio test or the nearest neighbor distance ratio test, may be applied. For example, the ratio test checks the ratio between the distances of the two best matches for each key point and associated descriptor. If the ratio is below a certain threshold, the match is considered valid. The nearest neighbor distance ratio test compares the distance of the best match with the distance of the second-best match. If the distance ratio is below a threshold, the match is accepted. It should be understood that different key point matching algorithms may be adopted by the key point matching module 306 in different embodiments. For example, another way for finding correspondences of two key points representing the same features in different images is by determining when the Euclidean distance of two corresponding descriptors of two key points from different images is smaller than a threshold or the smallest in all key point descriptor space. Other similar algorithms, such as ratio analysis/test, cross check, and grid-based motion statistics method may also be used to determine whether two key-points correspond to one another for determining the second set of key points from the first set of key points and the second set of descriptors from the first set of the descriptors by key point matching. For example, ratio test may be implemented between the discrepancy of the current descriptor with its closest descriptor in the other set and the discrepancy with its second closest descriptor to determine if a match is reliable. In some embodiments, a threshold on these algorithms may allow for the removal of many key point outliers while keeping most of the matching key points intact. It should be understood that a balance of the algorithm speed, accuracy and robustness should be taken into consideration, with the determined matching key points and associated descriptor being the basic input for generating the bounding boxes for object tracking.

In some embodiments, the bounding boxes associated with the objects may be generated by the bounding box generating module 308. In some embodiments, the bounding boxes can be further processed by the bounding box averaging module 310. For example, referring back to FIGS. 1A-1C, the first and second bounding boxes 104 and 114 may be a "key," "starting," or "reference" bounding boxes generated by the bounding box generating module 308. From these key, starting, or reference bounding boxes, the third bounding box 124 may be the "final output" bounding box generated by, for example, the bounding box averaging module 310 by averaging the previous (e.g., first and second) bounding boxes 104, 114, as described above. In such embodiments, the attributes of the output bounding box can be set based on the predicted target location or target dimension, before the output bounding box is provided for object tracking in the current frame. By processing the output bounding box based on the history of the bounding boxes in previous frames, the changes in the location or dimensions of the output bounding box can become more aligned with the historical average, which can improve the smoothness (and reduce a degree of jitter) of the output bounding box across a set of image frames. It is noted that detecting and matching keypoints with associated descriptors alone are not sufficient to generate bounding boxes from "key," "starting," or "reference" bounding boxes. Rather, post-matching, a geometric transformation must be determined applied to the "key," "starting," or "reference" bounding boxes. The transformation is obtained from the respective image coordinates of the matched keypoints, using an appropriate transformation model such similarity transform, affine transform and holography. To overcome potential false matches, robust approaches such as RANSAC (RANdom SAmple Consensus) may be used.

Also, distance estimation is one of the most important challenges to provide the security and safety alerts for the driver. To provide security and safety alerts for the driver, in some embodiments, the key points and associated descriptors may also be configured for distance measuring and calibration purposes. For example, distance estimation, measurement, and evaluation may be conducted per image frame based on the key point and its associated spatial information. In some embodiments, the spatial information may be the relative position of pairs of image pixels, defined with distance and orientation in three dimensions that describe the location of the second pixel with respect to the first. In some embodiments, the spatial information may identify spatial locations of the respective image pixel point and attribute information defining one or more attributes associated with the respective point. For example, for autonomous driving, the spatial information may include the dimensions of the vehicle and its components (e.g., the dimension or shape of the logo, taillight, window, tire, etc.) or the relative distance or location of the vehicle and its components. In the step for distance estimation, formula may be developed to describe the relationship between pixel area and distance. For example, as shown in the FIG. 4, when the object (e.g., a van in front of the controlled vehicle) is closer to the vehicle as shown in the image frame 402, the same van appears to be bigger, and pixel area of the key points 406B may be larger. In contrast, when the van in front of the controlled vehicle is far away from the controlled vehicle as shown in the image frame 400, the same van appears to be smaller, and pixel area of the key points 406A may be smaller. Accordingly, a mathematical model may be developed to establish the relationship between the pixel area and distance to estimate/evaluate the distance between the vehicles and/or objects from the controlled vehicle.

In some embodiments, the image of the surrounding vehicle or object may be captured using a camera sensor, and the key features of the vehicle or object may be extracted and located to calculate the distance. For efficient feature extraction and localizing of the feature position, algorithms such as the above-described examples of classic and deep keypoint detectors-descriptors algorithms may be utilized to find the key points. In such embodiments, the distance measuring module 312 may be configured to determine associations between a first set of key points or descriptor of the object with a corresponding second set of key points or descriptor (e.g., reducing the number of key points in the second set to reduce computational complexity yet maintaining the stability and accuracy). The first set of key points may be corresponding to the distance measuring target object, and the second set of key points may be obtained based on geometrical similarities between respective key points of the first set of key points and the second set of key points from a non-volatile memory in some embodiments.

In some embodiments, geometric consistency or verification may be imposed to further reduce the number of matching key points after the matching process. The distance measuring module 312 may be further configured to obtain the spatial information about the second set of key points from the non-volatile memory and evaluate a distance of the object from the vehicle based on the first set of key points and the spatial information about the second set of key points. In some embodiments, each image frame may have about 5-20 matches, which will produce a relatively accurate distance estimation, including for occluded vehicles. For example, in some embodiments, the distance measuring module 312 may be configured to determine a distance between one or more objects (e.g., pedestrians, obstacles, or other vehicles) and an ego vehicle, which is a vehicle that contains the sensors that perceive the environment around the vehicle, based on the first set of key points and the spatial information about the second set of key points. In some embodiments, the ego vehicle may also be an arbitrary object. In some embodiments, the corresponding key point or descriptors may be a pre-learned set of repeatable key point or descriptors for a range of objects (e.g., different vehicles) in different scenarios and stored in a database that is accessible to the image processing system 300.

In some other embodiments, the calibrating module 314 may be configured for sensor (e.g., one or more camera sensors) auto-calibration purposes, for example, auto-calibrating a vehicle camera sensor during inference (i.e., while driving the vehicle). As camera calibration is the process of estimating camera parameters based on the captured images, the calibration may be performed across a sequence of image frames. For example, the calibrating module 314 may include a database of real-world spatial information, such as dimensions for different objects or 3D positions of certain object keypoints. In such embodiments, the calibrating module 314 may be configured to compare the detected dimensions of the same or different objects during inference in different image frames with the stored real-world spatial information for calibration of the driving system (e.g., the camera sensor), based on the detected key points/descriptors and the associated spatial information. For example, in some embodiments, spatial information of the top-ranked key point may be selected from the database for the calibration. In some embodiments, the automatic calibration function may be realized through continuously optimizing the calibration state of the camera, which facilitates the system to be in an optimal calibration state at all times, thereby improving the accuracy and fluency of the system operation.

For example, in some embodiments as shown in FIG. 4, the calibrating module 314 may be configured to obtain a first image frame 400 containing an object (e.g., the van in FIG. 4) in motion by a camera, and obtain a second image frame 402 containing the van by the camera. Then, the calibrating module 314 may be configured to determine a first set of key points 406A of the van in the first image frame 400, and determine a second set of key points 406B of the van in the second image frame 402. Next, the calibrating module 314 may be configured to obtain a first spatial information about the first set of key points 406A from a non-volatile memory, and obtain a second spatial information about the second set of key points 406B from the same or a different non-volatile memory. Accordingly, the calibrating module 314 may be configured to auto-calibrate the camera using the first and second spatial information.

It should be understood that the calibration parameter of a camera may include both internal and external camera parameters, and distortion coefficients. In some embodiments, these camera parameters may be configured to remove lens distortion effects from an image, measure planar objects, reconstruct three-dimensional (3-D) scenes from multiple cameras, and perform other computer vision applications. The internal parameter may be unique, and may often be constructed by a parameter matrix (fx, fy, cx, cy) and a distortion coefficient (including three radial coefficients k1, k2, and k3, and two tangential coefficients p1 and p2). The external parameter, usually not unique, may be determined by the position relationship between the camera and the spatial coordinate system, and may be constructed by a rotation matrix (such as a rotation matrix R3×3) and a translation matrix (such as Tx, Ty, and Tz). For example, in some embodiments, a calculation step may be performed to calculate the dimensional difference between the first and second spatial information, to obtain a new calibration parameter of the camera.

Figure 5:
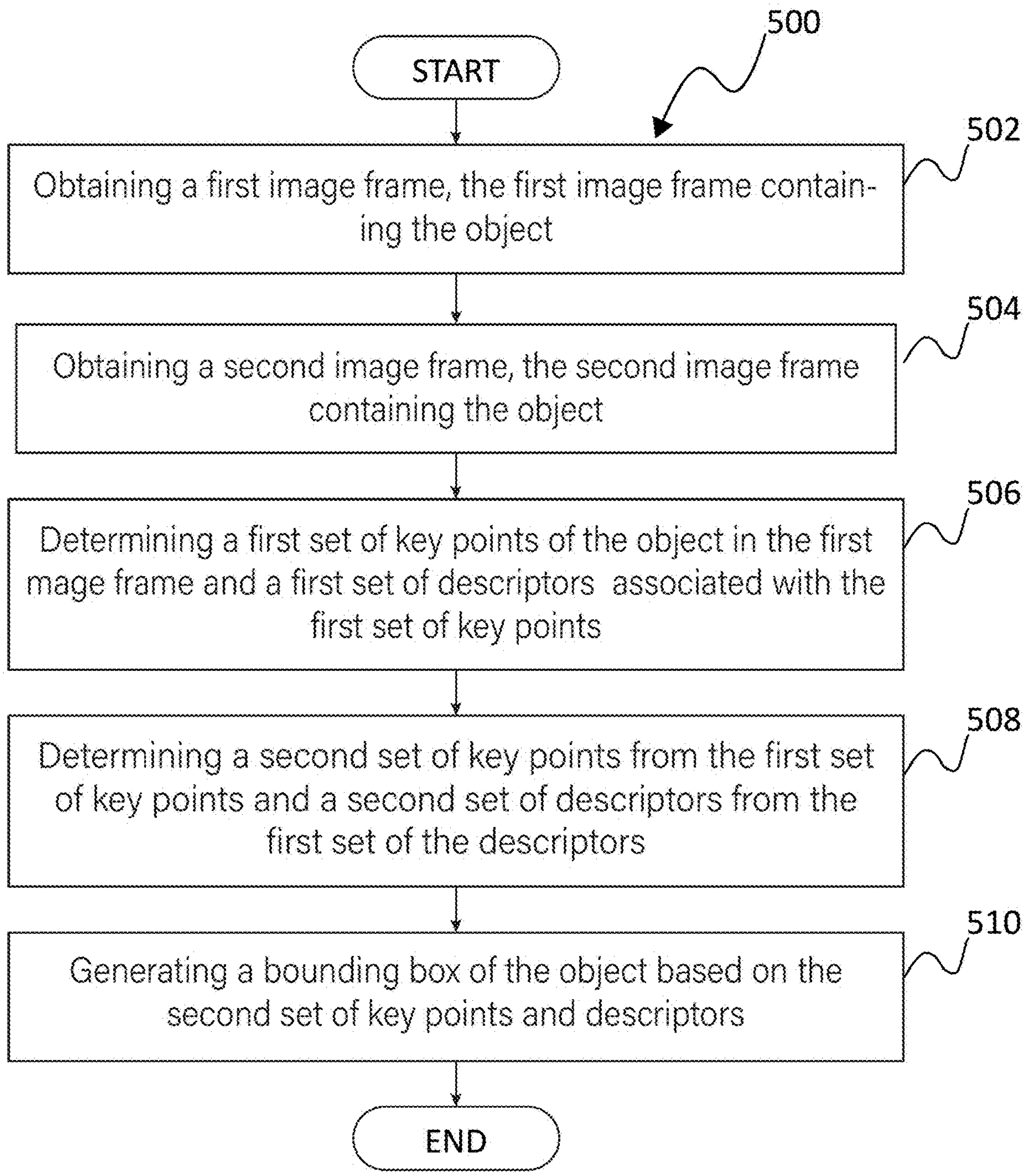
FIG. 5 is a flowchart illustrating an example of operations of generating bounding boxes, in accordance with some embodiments of the present disclosure.
Figure 6:
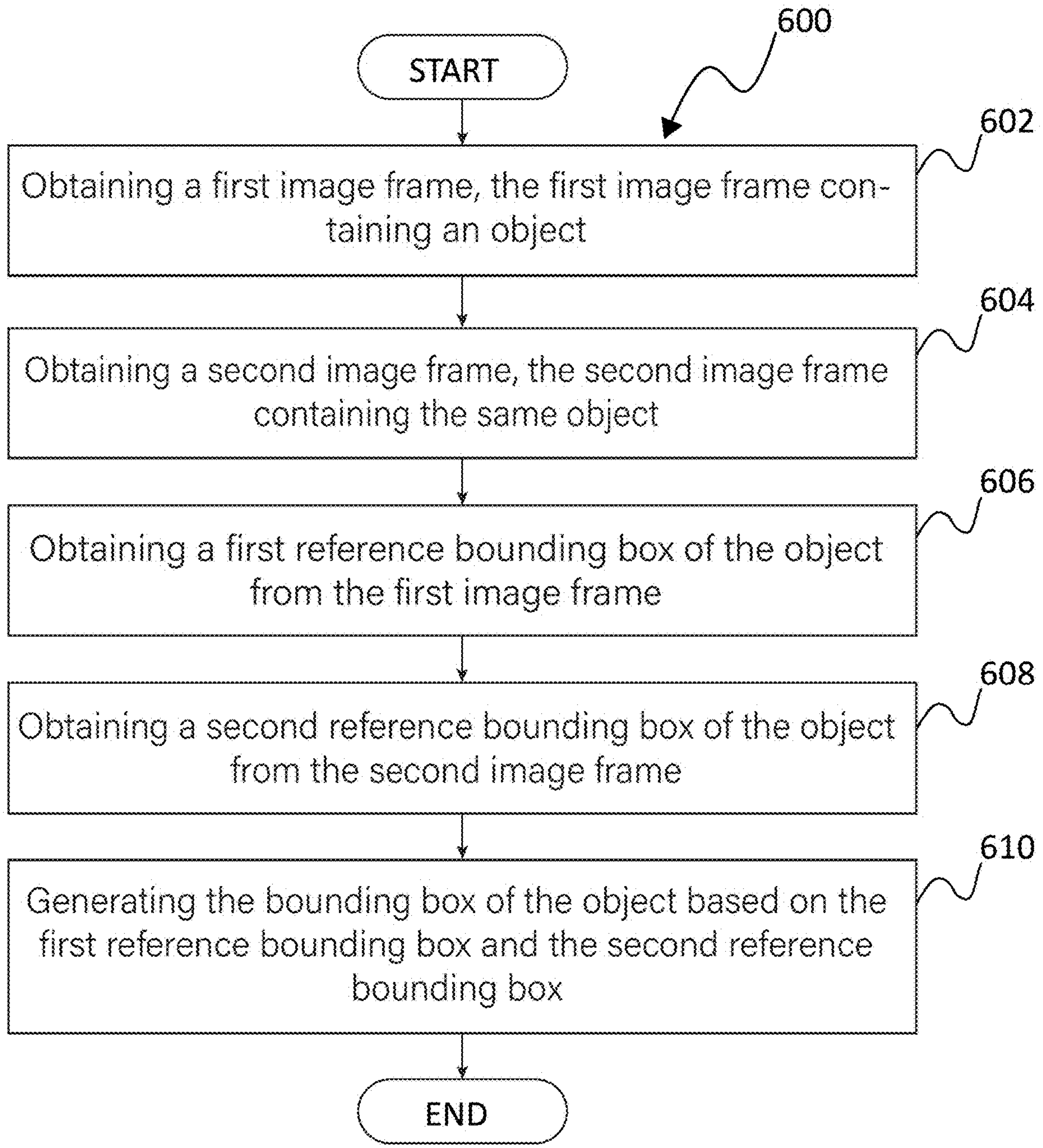
FIG. 6 is a flowchart illustrating another example of operations of generating bounding boxes, in accordance with some embodiments of the present disclosure.

Now turning to FIGS. 5-8, these figures illustrate three methods 500, 600, 700, and 800 corresponding to the method and models as discussed above that may be used to track object. It is noted that the sequence of the methods 500, 600, 700, and 800 is exemplary and indicates no order of the steps that the methods 500, 600, 700, and 800 are to be performed. As shown in FIG. 5, the method of operation 500 may start by obtaining a first image frame containing an object in block 502 and determining a first set of key points of the object in the first image frame and a first set of descriptors associated with the first set of key points in block 506. Then, a second set of key points of the object in the second image frame and a second set of descriptors associated with the second set of key points may be determined based on the first set of key points and the first set of the descriptors in block 508. Finally, a bounding box may be generated based on the second set of key points and descriptors in block 510.

In some embodiments, the method may further include obtaining a second image frame containing the same object in block 504. In such embodiments, the second set of key points may have a motion pattern identified by comparing key points in the first image frame and the second image frame, and the motion pattern may be different from a motion pattern of another set of key points separate from the second set of key points. In different embodiments, the step of determining the second set of key points from the first set of key points and the second set of descriptors from the first set of the descriptors is based on a ratio test, a cross check, or a grid-based motion statistic method.

In some embodiments, the method of 600 illustrates the operation of generating bounding boxes by averaging reference bounding boxes to increase the smoothness of the bounding box tracking. For example, the method of 600 may start in block 602 by obtaining a first image frame containing an object and obtaining a second image frame containing the same object in block 604. Then, in blocks 606 and 608, a first reference bounding box of the object from the first image frame and a second reference bounding box of the object from the second image frame may be obtained, respectively. In such embodiments, the bounding box of the object may be generated based on the first reference bounding box and the second reference bounding box in block 610. It should be understood that generating the bounding box of the object based on the first reference bounding box and the second reference bounding box is not limited here, and the bounding box averaging operation may include a plurality of reference bounding boxes (e.g., three or more bounding boxes). Again, to perform bounding box averaging, one must compensate for the object motion, by matching keypoints and associated descriptors, followed by solving for the geometric transformation.

Figure 7:
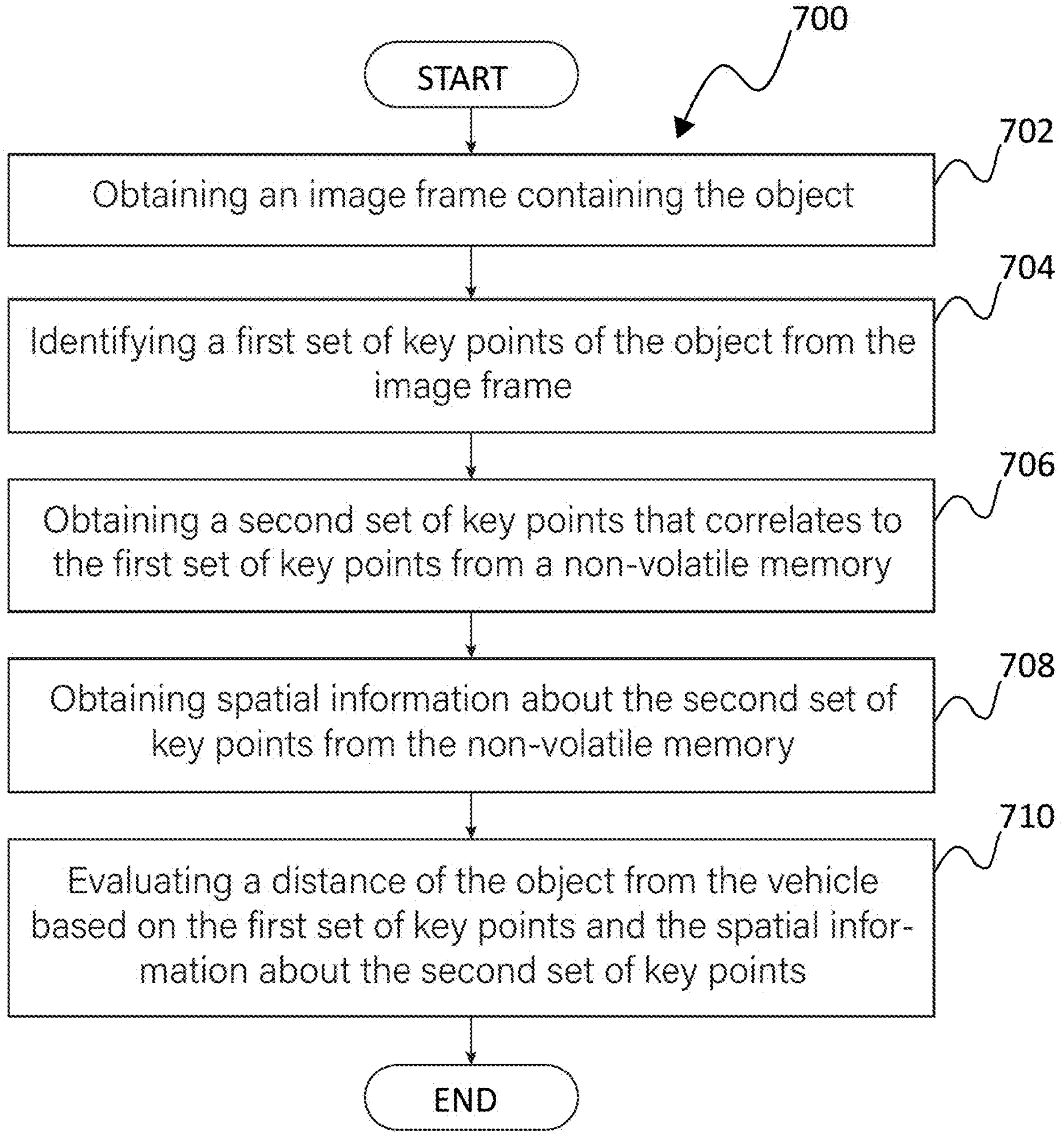
FIG. 7 is a flowchart illustrating an example of operations of distance estimation, in accordance with some embodiments of the present disclosure.

In some embodiments, as shown in FIG. 7, the method of 700 illustrates the operation of distance measuring or estimating of an object from a vehicle during driving. The method of 700 may start in block by obtaining an image frame containing the object in block 702. Then, a first set of key points of the object from the image frame may be identified in block 704, and a second set of key points that correlates to the first set of key points may be obtained from a non-volatile memory in block 706. Next, spatial information about the second set of key points from the non-volatile memory may be obtained in block 708, and a distance of the object from the vehicle may be evaluated based on the first set of key points and the spatial information about the second set of key points in block 710. In some embodiments, the image frame is captured by a device that is associated with a vehicle, a stationary object, or a drone. In some embodiments, evaluating the distance of the object from the vehicle includes matching geometric parameters of some of the second set of key points with geometric parameters of some of the first set of key points. In some embodiments, the non-volatile memory includes descriptors associated with the first and/or second set of key points. In such embodiments, the step of evaluating the distance of the object from the vehicle includes using the descriptors. In some embodiments, the object is a second vehicle, and the method further includes obtaining a make, a model, and/or a model year of the second vehicle from the non-volatile memory. In some embodiments, the non-volatile memory is a cloud database.

Figure 8:
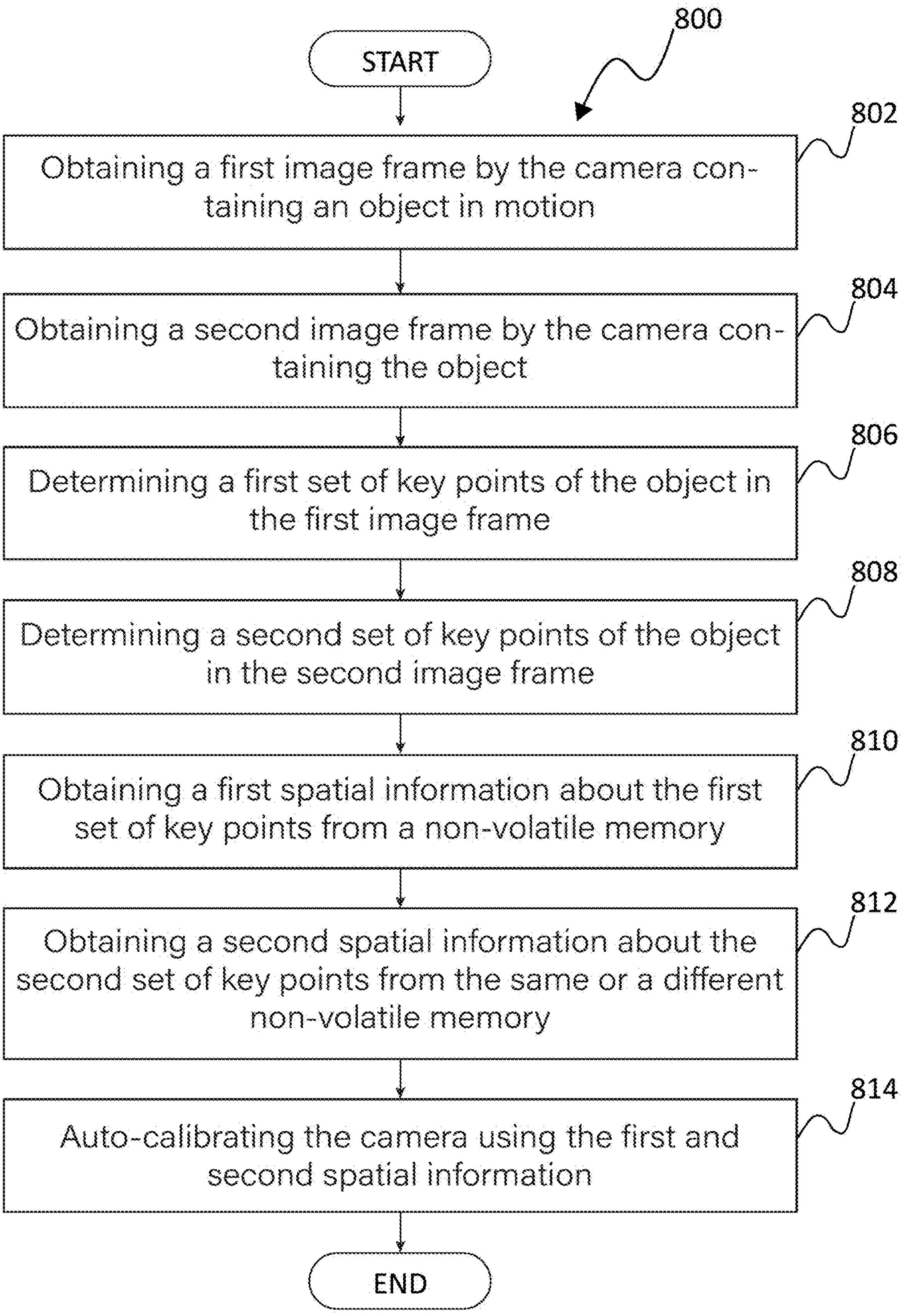
FIG. 8 is a flowchart illustrating an example of operations of camera auto-calibration, in accordance with some embodiments of the present disclosure.

In some embodiments, as shown in FIG. 8, the method of 800 illustrates the operation of auto calibrating, especially for a camera sensor. The method of 800 may start in block 802 by obtaining a first image frame by the camera containing an object in motion, and by obtaining a second image frame by the camera containing the object in block 804. Then, in block2 806 and 808, a first set of key points of the object in the first image frame and a second set of key points of the object in the second image frame may be determined, respectively. Next, a first spatial information about the first set of key points from a non-volatile memory and a second spatial information about the second set of key points from the same or a different non-volatile memory may be obtained in blocks 810 and 812, respectively. Then, in block 814, the camera may be auto-calibrated by using the first and second spatial information. In some embodiments, the first image frame and the second image frame may be within a sequence of different image frames. In some embodiments, the first image frame may be earlier in time than the second image frame. In some embodiments, the camera may be associated with a vehicle, a stationary object, or a drone. In some embodiments, the non-volatile memory may include descriptors associated with the first or second set of key points. In such embodiments, obtaining the spatial information from the non-volatile memory may include using the descriptors. In some embodiments, the non-volatile memory may be a cloud database. To obtain spatial information from the non-volatile memory, we must know which vehicle we observe (which may be identified by the make. model, or year of the vehicle), or in other words to recognize the vehicle. This can be done by, for example, computing a global signature of the observed vehicle and matching it against a database of global signatures.

In some embodiments, the functions/features described above may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be implemented in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, Flash memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

FIG. 9 illustrates an example hardware and software environment for an autonomous vehicle 900 within which various techniques disclosed herein may be implemented. The vehicle 900, for example, is shown driving on a road 901, and the vehicle 900 may include a powertrain 902 including a prime mover 906 powered by an energy source 904 and capable of providing power to a drivetrain 908, and a vehicle operating system 910 including a direction control 912, a powertrain control 914 and a brake control 916. The vehicle 900 may be implemented as any number of different types of vehicles, including vehicles capable of transporting people and/or cargo, and capable of traveling by land, by sea, by air, underground, undersea and/or in space, and it will be appreciated that the aforementioned components 902-916 can vary widely based upon the type of vehicle within which these components are utilized.

For simplicity, the embodiments discussed hereinafter will focus on a wheeled land vehicle such as a car, van, truck, bus, motorcycle, All-Terrain Vehicle (ATV), etc. In such embodiments, the energy source 904 may include, for example, a fuel system (e.g., providing gasoline, diesel, hydrogen, etc.), a battery system, solar panels, or other renewable energy sources, and/or a fuel cell system. The prime mover 906 may include one or more electric motors and/or an internal combustion engine (among others). The drivetrain 908 may include wheels and/or tires along with a transmission and/or any other mechanical drive components suitable for converting the output of the prime mover 906 into vehicular motion, and one or more brakes configured to controllably stop or slow the vehicle 900 and direction or steering components suitable for controlling the trajectory of the vehicle 900 (e.g., a rack and pinion steering linkage enabling one or more wheels of the vehicle 900 to pivot about a generally vertical axis to vary an angle of the rotational planes of the wheels relative to the longitudinal axis of the vehicle). In some embodiments, combinations of powertrains and energy sources may be used (e.g., in the case of electric/gas hybrid vehicles), and in other embodiments multiple electric motors (e.g., dedicated to individual wheels or axles) may be used as the prime mover 906. In the case of a hydrogen fuel cell implementation, the prime mover 906 may include one or more electric motors, and the energy source 904 may include a fuel cell system powered by hydrogen fuel.

The direction control 912 may include one or more actuators or sensors for controlling and receiving feedback from the direction or steering components to enable the vehicle 900 to follow a desired trajectory. The powertrain control 914 may be configured to control the output of the powertrain 902, (e.g., to control the output power of the prime mover 906, to control a gear of a transmission in the drivetrain 908, etc.), thereby controlling a speed and/or direction of the vehicle 900. The brake control 916 may be configured to control one or more brakes that slow or stop the vehicle 900, e.g., disk or drum brakes coupled to the wheels of the vehicle.

Other vehicle types, including but not limited to all-terrain or tracked vehicles, and construction equipment, may utilize different powertrains, drivetrains, energy sources, direction controls, powertrain controls and brake controls. Moreover, in some embodiments, some of the components can be combined, e.g., where directional control of a vehicle is primarily handled by varying an output of one or more prime movers. Therefore, embodiments disclosed herein are not limited to the particular application of the herein-described techniques in an autonomous, wheeled, land vehicle.

In the illustrated embodiment, full or semi-autonomous control over the vehicle 900 is implemented in a primary vehicle control system 918, which may include one or more processors 922 and one or more memories 924, with each processor 922 configured to execute program code instructions 926 stored in the memory 924. The processors 922 may include, for example, graphics processing unit(s) (GPU) and/or central processing unit(s) (CPU). The processors 922 may also include an application-specific integrated circuit (ASICs), other chipsets, logic circuits and/or data processing devices. The memory 924 may be used to load and store data and/or instructions, for example, for the control system 918. The memory 924 may include any combination of suitable volatile memory, for example, read-only memory (ROM), dynamic random access memory (DRAM), a random access memory (RAM), non-volatile memory such as a flash memory, a memory card, a storage medium and/or other storage devices. When the embodiments are implemented in software, the techniques described herein may be implemented with modules, procedures, functions, entities, and so on, that perform the functions described herein. The modules may be stored in a memory and executed by the processors. The memory may be implemented within a processor or external to the processor, in which those may be communicatively coupled to the processor via various means are known in the art.

Sensors 930 may include various sensors suitable for collecting information from a vehicle's surrounding environment for use in controlling the operation of the vehicle 900. For example, the sensors 930 may include one or more detection and ranging sensors (e.g., a RADAR sensor 934, a LIDAR sensor 936, or both), a satellite navigation (SAT-NAV) sensor 932, e.g., compatible with any of various satellite navigation systems such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The Radio Detection and Ranging (RADAR) 934 and Light Detection and Ranging (LIDAR) sensors 936, as well as a digital camera 938 (which may include various types of image capture devices capable of capturing still and/or video imagery), may be used to sense stationary and moving objects within the immediate vicinity of a vehicle. The camera 938 can be a monographic or stereographic camera and can record still and/or video images. The SAT-NAV sensor 932 can be used to determine the location of the vehicle on the Earth using satellite signals. The sensors 930 can optionally include an Inertial Measurement Unit (IMU) 940. The IMU 940 may include multiple gyroscopes and accelerometers capable of detecting linear and rotational motion of the vehicle 900 in three directions. One or more other types of sensors, such as wheel rotation sensors/encoders 942 may be used to monitor the rotation of one or more wheels of vehicle 900.

In a variety of embodiments, a removable hardware pod is vehicle agnostic and therefore can be mounted on a variety of non-autonomous vehicles including: a car, a bus, a van, a truck, a moped, a tractor trailer, a sports utility vehicle, etc. While autonomous vehicles generally contain a full sensor suite, in many embodiments a removable hardware pod can contain a specialized sensor suite, often with fewer sensors than a full autonomous vehicle sensor suite, which can include: an IMU, 3-D positioning sensors, one or more cameras, a LIDAR unit, etc. Additionally or alternatively, the hardware pod can collect data from the non-autonomous vehicle itself, for example, by integrating with the vehicle's CAN bus to collect a variety of vehicle data including: vehicle speed data, braking data, steering control data, etc. In some embodiments, removable hardware pods can include a computing device which can aggregate data collected by the removable pod sensor suite as well as vehicle data collected from the CAN bus, and upload the collected data to a computing system for further processing (e.g., uploading the data to the cloud). In many embodiments, the computing device in the removable pod can apply a time stamp to each instance of data prior to uploading the data for further processing. Additionally or alternatively, one or more sensors within the removable hardware pod can apply a time stamp to data as it is collected (e.g., a lidar unit can provide its own time stamp). Similarly, a computing device within an autonomous vehicle can apply a time stamp to data collected by the autonomous vehicle's sensor suite, and the time stamped autonomous vehicle data can be uploaded to the computer system for additional processing.

The outputs of sensors 930 may be provided to a set of primary control subsystems 920, including, for example, a localization subsystem, a perception subsystem, a planning subsystem, and a control subsystem. The localization subsystem is principally responsible for precisely determining the location and orientation (also sometimes referred to as "pose" or "pose estimation") of the vehicle 900 within its surrounding environment, and generally within some frame of reference. In some embodiments, the pose is stored within the memory 924 as localization data. In some embodiments, a surface model is generated from a high-definition map and stored within the memory 924 as surface model data. In some embodiments, the detection and ranging sensors store their sensor data in the memory 924, (e.g., radar data point cloud is stored as radar data). In some embodiments, calibration data is stored in the memory 924. The perception subsystem is principally responsible for detecting, tracking, and/or identifying objects within the environment surrounding vehicle 900. A machine learning model, such as the one discussed above in accordance with some embodiments, can be utilized in planning a vehicle trajectory. The control subsystem 920 is principally responsible for generating suitable control signals for controlling the various controls in the vehicle control system 918 in order to implement the planned trajectory of the vehicle 900. Similarly, a machine learning model can be utilized to generate one or more signals to control the autonomous vehicle 900 to implement the planned trajectory.

It will be appreciated that the collection of components illustrated in FIG. 9 for the vehicle control system 918 is merely one example. Individual sensors may be omitted in some embodiments. Additionally, or alternatively, in some embodiments, multiple sensors of the same types illustrated in FIG. 9 may be used for redundancy and/or to cover different regions around a vehicle. Moreover, there may be additional sensors of other types beyond those described above to provide actual sensor data related to the operation and environment of the wheeled land vehicle. Likewise, different types and/or combinations of control subsystems may be used in other embodiments. Further, while the primary control subsystems 920 is illustrated as being separate from the processor 922 and memory 924, it will be appreciated that in some embodiments, some or all of the functionality of the primary control subsystems 920 may be implemented with program code instructions 926 resident in one or more memories 924 and executed by one or more processors 922, and the primary control subsystems 920 may in some instances be implemented using the same processor(s) and/or memory. Subsystems may be implemented at least in part using various dedicated circuit logic, various processors, various field programmable gate arrays (FPGA), various application-specific integrated circuits (ASIC), various real time controllers, and the like, as noted above, multiple subsystems may utilize circuitry, processors, sensors, and/or other components. Further, the various components in the vehicle control system 918 may be networked in various manners.

For example, the vehicle 900 may include one or more network interfaces, e.g., network interface 954, suitable for communicating with one or more networks 950 (e.g., a LAN, a WAN, a wireless network, and/or the Internet, among others) to permit the communication of information with other vehicles, computers and/or electronic devices, including, for example, a central service, such as a cloud service, from which the vehicle 900 receives environmental and other data for use in autonomous control thereof.

In addition, for additional storage, the vehicle 900 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, the vehicle 900 may include a user interface 952 to enable the vehicle 900 to receive a number of inputs from and generate outputs for a user or operator, e.g., one or more displays, touchscreens, voice and/or gesture interfaces, buttons, and other tactile controls, etc. Otherwise, user input may be received via another computer or electronic device, e.g., via an app on a mobile device or via a web interface, e.g., from a remote operator.

Systems and methods are disclosed herein related to object detection and detection confidence. Disclosed approaches may be suitable for autonomous driving, but may also be used for other applications, such as robotics, video analysis, weather forecasting, medical imaging, etc. The present disclosure may be described with respect to an example autonomous vehicle 900. Although the present disclosure primarily provides examples using autonomous vehicles, other types of devices may be used to implement those various approaches described herein, such as robots, camera systems, weather forecasting devices, medical imaging devices, etc. In addition, these approaches may be used for controlling autonomous vehicles, or for other purposes, such as, without limitation, video surveillance, video or image editing, video or image search or retrieval, object tracking, weather forecasting (e.g., using radar data), and/or medical imaging (e.g., using ultrasound or Magnetic Resonance Imaging (MRI) data).

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of the application and design requirement for a technical plan. A person having ordinary skill in the art may use different ways to realize the function for each specific application while such realizations should not go beyond the scope of the present disclosure. It is understood by a person having ordinary skill in the art that he/she may refer to the working processes of the system, device, and unit in the above-mentioned embodiment since the working processes of the above-mentioned system, device, and unit is basically the same. For easy description and simplicity, these working processes will not be detailed.

If the software function unit is realized and used and sold as a product, it may be stored in a readable storage medium in a computer. Based on this understanding, the technical plan proposed by the present disclosure may be essentially or partially realized as the form of a software product. Or one part of the technical plan beneficial to the conventional technology may be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a ROM, a RAM, a floppy disk, or other kinds of media capable of storing program codes. While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word ‘comprising’ does not exclude the presence of other elements or steps than those listed in a claim. Furthermore, the terms “a” or “an,” as used herein, are defined as one or more than one. Also, the use of introductory phrases such as “at least one” and “one or more” in the claims should not be construed to imply that the introduction of another claim element by the indefinite articles “a” or “an” limits any particular claim containing such introduced claim element to inventions containing only one such element, even when the same claim includes the introductory phrases “one or more” or “at least one” and indefinite articles such as “a” or “an.” The same holds true for the use of definite articles. Unless stated otherwise, terms such as “first” and “second” are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination. It will be appreciated by people skilled in the art that the embodiments of the disclosure are not limited by what has been particularly shown and described hereinabove. Rather the scope of the embodiments of the disclosure is defined by the appended claims and equivalents thereof.

The previous description of the disclosed embodiments is provided to enable others to make or use the disclosed subject matter. Various modifications to these embodiments will be readily apparent, and the generic principles defined herein may be applied to other embodiments without departing from the spirit or scope of the previous description. Thus, the previous description is not intended to be limited to the embodiments shown herein but is to be accorded the widest scope consistent with the principles and novel features disclosed herein. Thus, the claims are not intended to be limited to the aspects shown herein but is to be accorded the full scope consistent with the language claims, wherein reference to an element in the singular is not intended to mean “one and only one” unless specifically so stated, but rather “one or more.” Unless specifically stated otherwise, the term “some” refers to one or more. All structural and functional equivalents to the elements of the various aspects described throughout the previous description that are known or later come to be known are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase “means for.” It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order and are not meant to be limited to the specific order or hierarchy presented.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example. The foregoing method descriptions and the process flow diagrams are provided merely as illustrative examples and are not intended to require or imply that the blocks of various examples must be performed in the order presented. As will be appreciated, the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular. The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. The hardware used to implement the various illustrative logics, logical blocks, modules, and circuits described in connection with the examples disclosed herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

Further embodiments are listed below.

Embodiment 1. A method for tracking an object in one or more image frames, comprising: obtaining a first image frame, the first image frame including the object; determining a first set of key points of the object in the first image frame and a first set of descriptors associated with the first set of key points; determining a second set of key points from the first set of key points and a second set of descriptors from the first set of the descriptors; and generating a bounding box of the object based on the second set of key points and descriptors.

Embodiment 2. The method of Embodiment 1, further comprising: obtaining a second image frame, the second image frame including the object, wherein, the second set of key points have a motion pattern identified by comparing key points in the first image frame and the second image frame, the motion pattern being different from a motion pattern of another set of key points separate from the second set of key points.

Embodiment 3. The method of Embodiments 1-2, further comprising: obtaining a second image frame, the second image frame including the object, wherein the determining of the second set of key points from the first set of key points and the second set of descriptors from the first set of descriptors is done by comparing a distance between corresponding first set of key points in the first and second image frames with a threshold.

Embodiment 4. The method of Embodiments 1-3, wherein the step of determining the second set of key points from the first set of key points and the second set of descriptors from the first set of the descriptors is based on a ratio test.

Embodiment 5. The method of Embodiments 1-4, wherein the step of determining the second set of key points from the first set of key points and the second set of descriptors from the first set of the descriptors is based on a cross check.

Embodiment 6. The method of Embodiments 1-5, wherein the step of determining the second set of key points from the first set of key points and the second set of descriptors from the first set of the descriptors is based on a grid-based motion statistic method.

Embodiment 7. The method of Embodiments 1-6, further comprising: obtaining a second image frame, the second image frame including the object; obtaining a first reference bounding box of the object from the first image frame; obtaining a second reference bounding box of the object from the second image frame; and generating the bounding box of the object based on the first reference bounding box and the second reference bounding box.

Embodiment 8. The method of Embodiment 6, wherein generating the bounding box of the object based on the first reference bounding box and the second reference bounding box includes averaging a plurality of reference bounding boxes.

Embodiment 9. An apparatus for tracking an object in one or more image frames, the apparatus comprising: an interface hardware configured to obtain the one or more image frames; a memory unit for storing the one or more image frames; a processing unit coupled to the interface hardware and the memory unit, the processing unit configured to track the object in the one or more image frames by: obtaining a first image frame, the first image frame including the object; determining a first set of key points of the object in the first image frame and a first set of descriptors associated with the first set of key points; determining a second set of key points from the first set of key points and a second set of descriptors from the first set of the descriptors; and generating a bounding box of the object based on the second set of key points and descriptors.

Embodiment 10. The apparatus of Embodiment 9, the operations further comprising: obtaining a second image frame, the second image frame including the object, wherein, the second set of key points have a motion pattern identified by comparing key points in the first image frame and the second image frame, the motion pattern is different from a motion pattern of another set of key points separate from the second set of key points.

Embodiment 11. The apparatus of Embodiments 9-10, the operations further comprising: obtaining a second image frame, the second image frame including the object, wherein the step of determining the second set of key points from the first set of key points and the second set of descriptors from the first set of descriptors is done by comparing a distance between corresponding first set of key points in the first and second image frames with a threshold.

Embodiment 12. The apparatus of Embodiments 9-11, wherein the step of determining the second set of key points from the first set of key points and the second set of descriptors from the first set of the descriptors is based on a ratio test.

Embodiment 13. The apparatus of Embodiments 9-12, wherein obtaining the second set of key points from the first set of key points and the second set of descriptors from the first set of the descriptors is based on a cross check.

Embodiment 14. The apparatus of Embodiments 9-13, wherein obtaining the second set of key points from the first set of key points and the second set of descriptors from the first set of the descriptors is based on a grid-based motion statistic method.

Embodiment 15. The apparatus of Embodiments 9-14, the operations further comprising: obtaining a second image frame, the second image frame including the object; obtaining a first reference bounding box of the object from the first image frame; obtaining a second reference bounding box of the object from the second image frame; and generating the bounding box of the object based on the first reference bounding box and the second reference bounding box.

Embodiment 16. The apparatus of Embodiment 15, wherein generating the bounding box of the object based on the first reference bounding box and the second reference bounding box includes averaging a plurality of reference bounding boxes.

Embodiment 17. A non-transitory computer readable storage medium storing computer instructions executable by one or more processors to perform a process for tracking an object in one or more image frames, the process comprising: obtaining a first image frame, the first image frame including the object; determining a first set of key points of the object in the first image frame and a first set of descriptors associated with the first set of key points; determining a second set of key points from the first set of key points and a second set of descriptors from the first set of the descriptors; and generating a bounding box of the object based on the second set of key points and descriptors.

Embodiment 18. The non-transitory computer readable storage medium of Embodiment 17, further comprising: obtaining a second image frame, the second image frame including the object, wherein, the second set of key points have a motion pattern identified by comparing key points in the first image frame and the second image frame, the motion pattern is different from a motion pattern of another set of key points separate from the second set of key points.

Embodiment 19. The non-transitory computer readable storage medium of Embodiments 17-18, further comprising: obtaining a second image frame, the second image frame including the object, wherein the step of determining the second set of key points from the first set of key points and the second set of descriptors from the first set of descriptors is done by comparing a distance between corresponding first set of key points in the first and second image frames with a threshold.

Embodiment 20. The non-transitory computer readable storage medium of Embodiments 17-19, further comprising: obtaining a second image frame, the second image frame including the object; obtaining a first reference bounding box of the object from the first image frame; obtaining a second reference bounding box of the object from the second image frame; and generating the bounding box of the object based on the first reference bounding box and the second reference bounding box.

Embodiment 21. A method for distance estimation of an object from a vehicle, comprising: obtaining an image frame including the object; identifying a first set of key points of the object from the image frame; obtaining a second set of key points that correlates to the first set of key points from a non-volatile memory; obtaining spatial information about the second set of key points from the non-volatile memory; and evaluating a distance of the object from the vehicle based on the first set of key points and the spatial information about the second set of key points.

Embodiment 22. The method of Embodiment 21, wherein the image frame is captured by a device that is associated with a vehicle, a stationary object, or a drone.

Embodiment 23. The method of Embodiments 21-22, wherein evaluating the distance of the object from the vehicle includes matching geometric parameters of one or more of the second set of key points with geometric parameters of one or more of the first set of key points.

Embodiment 24. The method of Embodiments 21-23, wherein the non-volatile memory includes descriptors associated with the first or the second set of key points.

Embodiment 25. The method of Embodiment 24, wherein the distance of the object from the vehicle is evaluated based on the descriptors.

Embodiment 26. The method of Embodiments 21-25, wherein the object is a second vehicle, and the method further comprises obtaining a make, a model, or a model year of the second vehicle from the non-volatile memory.

Embodiment 27. The method of Embodiments 21-26, wherein the non-volatile memory is a cloud database.

Embodiment 28. An apparatus for distance estimation of an object from a vehicle, the apparatus comprising: an interface hardware configured to obtain an image frame; a memory unit for storing the image frame; a processing unit coupled to the interface hardware and the memory unit, the processing unit being configured to distance estimation of an object from a vehicle during driving, wherein method comprises: obtaining an image frame including the object; identifying a first set of key points of the object from the image frame; obtaining a second set of key points that correlates to the first set of key points from a non-volatile memory; obtaining spatial information about the second set of key points from the non-volatile memory; and evaluating a distance of the object from the vehicle based on the first set of key points and the spatial information about the second set of key points.

Embodiment 29. The apparatus of Embodiment 28, wherein the image frame is captured by a device that is associated with a vehicle, a stationary object, or a drone.

Embodiment 30. The apparatus of Embodiments 28-29, wherein evaluating the distance of the object from the vehicle includes matching geometric parameters of one or more of the second set of key points with geometric parameters of one or more of the first set of key points.

Embodiment 31. The apparatus of Embodiments 28-30, wherein the non-volatile memory includes descriptors associated with the first or the second set of key points.

Embodiment 32. The apparatus of Embodiment 31, wherein the distance of the object from the vehicle is evaluated based on the descriptors.

Embodiment 33. The apparatus of Embodiments 28-32, wherein the object is a second vehicle, and the method further comprises obtaining a make, a model, or a model year of the second vehicle from the non-volatile memory.

Embodiment 34. The apparatus of Embodiments 28-33, wherein the non-volatile memory is a cloud database.

Embodiment 35. A non-transitory computer readable storage medium storing computer instructions executable by one or more processors to perform a method for distance estimation of an object from a vehicle, the method comprising: obtaining an image frame including the object; identifying a first set of key points of the object from the image frame; obtaining a second set of key points that correlates to the first set of key points from a non-volatile memory; obtaining spatial information about the second set of key points from the non-volatile memory; and evaluating a distance of the object from the vehicle based on the first set of key points and the spatial information about the second set of key points.

Embodiment 36. The non-transitory computer readable storage medium of Embodiment 35, wherein the image frame is captured by a device that is associated with a vehicle, a stationary object, or a drone.

Embodiment 37. The non-transitory computer readable storage medium of Embodiments 35-36, wherein evaluating the distance of the object from the vehicle includes matching geometric parameters of one or more of the second set of key points with geometric parameters of one or more of the first set of key points.

Embodiment 38. The non-transitory computer readable storage medium of Embodiments 35-37, wherein the non-volatile memory includes descriptors associated with the first and/or second set of key points.

Embodiment 39. The non-transitory computer readable storage medium of Embodiment 38, wherein the distance of the object from the vehicle is evaluated based on the descriptors.

Embodiment 40. The non-transitory computer readable storage medium of Embodiments 35-39, wherein the object is a second vehicle, and the method further comprises obtaining a make, a model, or a model year of the second vehicle from the non-volatile memory.

Embodiment 41. A method for calibration of a camera of a vehicle, comprising: obtaining a first image frame by the camera including an object; obtaining a second image frame by the camera including the object; determining a first set of key points of the object in the first image frame; determining a second set of key points of the object in the second image frame; obtaining a first spatial information about the first set of key points from a non-volatile memory; obtaining a second spatial information about the second set of key points from the same or a different non-volatile memory; and auto-calibrating the camera based on the first and the second spatial information.

Embodiment 42. The method of Embodiment 41, wherein the first image frame and the second image frame are within a sequence of different image frames.

Embodiment 43. The method of Embodiments 41-42, wherein the first image frame is obtained earlier in time than the second image frame in a sequence.

Embodiment 44. The method of Embodiments 41-43, wherein the camera is associated with a vehicle, a stationary object, or a drone.

Embodiment 45. The method of Embodiments 41-44, wherein the non-volatile memory includes descriptors associated with the first or second set of key points.

Embodiment 46. The method of Embodiment 45, wherein the spatial information is obtained from the non-volatile memory based on the descriptors.

Embodiment 47. The method of Embodiments 41-46, wherein the non-volatile memory is a cloud database.

Embodiment 48. An apparatus for calibration of a camera of a vehicle, the apparatus comprising: an interface hardware configured to obtain a plurality of image frames; a memory unit for storing the plurality of image frames; a processing unit coupled to the interface hardware and the memory unit, the processing unit being configured to calibrate the camera of the vehicle during driving by: obtaining a first image frame by the camera including an object; obtaining a second image frame by the camera including the object; determining a first set of key points of the object in the first image frame; determining a second set of key points of the object in the second image frame; obtaining a first spatial information about the first set of key points from a non-volatile memory; obtaining a second spatial information about the second set of key points from the same or a different non-volatile memory; and auto-calibrating the camera based on the first and the second spatial information.

Embodiment 49. The apparatus of Embodiment 48, wherein the first image frame and the second image frame are within a sequence of different image frames.

Embodiment 50. The apparatus of Embodiments 48-49, wherein the first image frame is obtained earlier in time than the second image frame in a sequence.

Embodiment 51. The apparatus of Embodiments 48-50, wherein the camera is associated with a vehicle, a stationary object, or a drone.

Embodiment 52. The apparatus of Embodiments 48-51, wherein the non-volatile memory includes descriptors associated with the first or second set of key points.

Embodiment 53. The apparatus of Embodiment 52, wherein the spatial information is obtained from the non-volatile memory based on the descriptors.

Embodiment 54. The apparatus of Embodiments 48-53, wherein the non-volatile memory is a cloud database.

Embodiment 55. A non-transitory computer readable storage medium storing computer instructions executable by one or more processors to perform a method for calibration of a camera of a vehicle, the method comprising: obtaining a first image frame by the camera including an object; obtaining a second image frame by the camera including the object; determining a first set of key points of the object in the first image frame; determining a second set of key points of the object in the second image frame; obtaining a first spatial information about the first set of key points from a non-volatile memory; obtaining a second spatial information about the second set of key points from the same or a different non-volatile memory; and auto-calibrating the camera based on the first and the second spatial information.

Embodiment 56. The non-transitory computer readable storage medium of Embodiment 55, wherein the first image frame and the second image frame are within a sequence of different image frames.

Embodiment 57. The non-transitory computer readable storage medium of Embodiments 55-56, wherein the first image frame is obtained earlier in time than the second image frame in a sequence.

Embodiment 58. The non-transitory computer readable storage medium of Embodiments 55-57, wherein the camera is associated with a vehicle, a stationary object, or a drone.

Embodiment 59. The non-transitory computer readable storage medium of Embodiments 55-58, wherein the non-volatile memory includes descriptors associated with the first or second set of key points.

Embodiment 60. The non-transitory computer readable storage medium of Embodiment 59, wherein the spatial information is obtained from the non-volatile memory based on the descriptors.

What is claimed is:

1. A method for distance estimation of an object from a vehicle, comprising:

obtaining an image frame including the object;

identifying a first set of key points of the object from the image frame;

obtaining a second set of key points that correlates to the first set of key points from a non-volatile memory;

obtaining spatial information about the second set of key points from the non-volatile memory; wherein the spatial information about the second set of key points is indicative of relative positions of the key points of the second set defined in distances and orientations; and evaluating a distance of the object from the vehicle based on the first set of key points and the spatial information about the second set of key points; wherein the evaluating of the distance of the object from the vehicle comprises matching the spatial information about one or more of the second set of key points with spatial information about one or more of the first set of key points; wherein the spatial information about the first set of key points is indicative of relative positions of the key points of the first set defined in distances and orientations.

2. The method of claim 1, wherein the image frame is captured by a device that is associated with a vehicle, a stationary object, or a drone.

3. The method of claim 1, wherein the non-volatile memory includes descriptors associated with the first or the second set of key points.

4. The method of claim 1, wherein the spatial information about the second set of key points is further indicative of size and dimensions of components represented by the key points of the second set of key points.

5. An apparatus for distance estimation of an object from a vehicle, the apparatus comprising:

an interface hardware configured to obtain an image frame;

a memory unit for storing the image frame;

a processing unit coupled to the interface hardware and the memory unit, the processing unit being configured to distance estimation of an object from a vehicle during driving, wherein method comprises:

obtaining an image frame including the object;

identifying a first set of key points of the object from the image frame;

obtaining a second set of key points that correlates to the first set of key points from a non-volatile memory;

obtaining spatial information about the second set of key points from the non-volatile memory; wherein the spatial information about the second set of key points is indicative of relative positions of the key points of the second set defined in distances and orientations; and evaluating a distance of the object from the vehicle based on the first set of key points and the spatial information about the second set of key points; wherein the evaluating of the distance of the object from the vehicle comprises matching the spatial information about one or more of the second set of key points with spatial information about one or more of the first set of key points; wherein the spatial information about the first set of key points is indicative of relative positions of the key points of the first set defined in distances and orientations.

6. The apparatus of claim 5, wherein the image frame is captured by a device that is associated with a vehicle, a stationary object, or a drone.

7. The apparatus of claim 5, wherein the non-volatile memory includes descriptors associated with the first or the second set of key points.

8. The apparatus of claim 5, wherein spatial information about the second set of key points is further indicative of size and dimensions of components represented by the key points of the second set of key points.

9. A non-transitory computer readable storage medium storing computer instructions executable by one or more processors to perform a method for distance estimation of an object from a vehicle, the method comprising:

obtaining an image frame including the object;

identifying a first set of key points of the object from the image frame;

obtaining a second set of key points that correlates to the first set of key points from a non-volatile memory;

obtaining spatial information about the second set of key points from the non-volatile memory; wherein the spatial information about the second set of key points is indicative of relative positions of the key points of the second set defined in distances and orientations; and evaluating a distance of the object from the vehicle based on the first set of key points and the spatial information about the second set of key points; wherein the evaluating of the distance of the object from the vehicle comprises matching the spatial information about one or more of the second set of key points with spatial information about one or more of the first set of key points; wherein the spatial information about the first set of key points is indicative of relative positions of the key points of the first set defined in distances and orientations.

10. The non-transitory computer readable storage medium of claim 9, wherein the image frame is captured by a device that is associated with a vehicle, a stationary object, or a drone.

11. The non-transitory computer readable storage medium of claim 9, wherein the non-volatile memory includes descriptors associated with the first and/or second set of key points.

* * * * *